United States Patent
Suzuki et al.

(10) Patent No.: US 10,825,145 B2
(45) Date of Patent: Nov. 3, 2020

(54) IMAGE PROCESSING DEVICE, IMAGE PROCESSING METHOD, AND NON-TRANSITORY COMPUTER READABLE MEDIUM STORING IMAGE PROCESSING PROGRAM

(71) Applicant: OLYMPUS CORPORATION, Tokyo (JP)

(72) Inventors: Daisuke Suzuki, Kanagawa (JP); Eiji Furukawa, Saitama (JP)

(73) Assignee: OLYMPUS CORPORATION, Tokyo (JP)

(*) Notice: Subject to any disclaimer, the term of this patent is extended or adjusted under 35 U.S.C. 154(b) by 34 days.

(21) Appl. No.: 16/162,483

(22) Filed: Oct. 17, 2018

(65) Prior Publication Data
US 2019/0050968 A1 Feb. 14, 2019

Related U.S. Application Data

(63) Continuation of application No. PCT/JP2016/063845, filed on May 10, 2016.

(51) Int. Cl.
*G06T 5/00* (2006.01)
*G06T 5/50* (2006.01)
(Continued)

(52) U.S. Cl.
CPC ............... *G06T 5/002* (2013.01); *G06T 1/20* (2013.01); *G06T 5/003* (2013.01); *G06T 5/20* (2013.01);
(Continued)

(58) Field of Classification Search
CPC . G06K 9/40; G06T 2207/20016; G06T 5/002; G06T 5/20; G06T 17/00;
(Continued)

(56) References Cited

U.S. PATENT DOCUMENTS 5,237,413 A * 8/1993 Israelsen ............... H04N 5/144
348/384.1
5,796,438 A * 8/1998 Hosono ............... G06T 3/4007
348/458
(Continued)

FOREIGN PATENT DOCUMENTS

| CN | 102737364 A | 10/2012 |
| EP | 1847957 A2 | 10/2007 |

(Continued)

OTHER PUBLICATIONS

International Search Report dated Jul. 26, 2016 issued in PCT/JP2016/063845.
(Continued)

*Primary Examiner* — Aklilu K Woldemariam
(74) *Attorney, Agent, or Firm* — Scully, Scott, Murphy & Presser, P.C.

(57) ABSTRACT

An image processing device includes: a frame memory that saves a cyclic image of an immediately preceding frame as a reference image; and a processor comprising hardware. The processor is configured to: decompose an input image into a plurality of resolution images; set, as a base image, an image having a lower resolution than the input image among the plurality of resolution images and that detects a motion vector between the base image and the reference image; subject the reference image to motion compensation on the basis of the motion vector to generate a motion-compensated image; combine the base image with the motion-compensated image to generate a noise-reduced base image that serves as a new cyclic image; and combine the noise-reduced base image with the resolution image or resolution images other than the base image among the plurality of resolution images.

4 Claims, 7 Drawing Sheets

(51) Int. Cl.
*H04N 5/21* (2006.01)
*H04N 19/513* (2014.01)
*G06T 1/20* (2006.01)
*G06T 5/20* (2006.01)

(52) U.S. Cl.
CPC .............. *G06T 5/50* (2013.01); *H04N 5/21* (2013.01); *H04N 19/513* (2014.11); *G06T 2207/10016* (2013.01); *G06T 2207/20021* (2013.01); *G06T 2207/20182* (2013.01); *G06T 2207/20201* (2013.01); *G06T 2207/20221* (2013.01)

(58) Field of Classification Search
CPC . G06T 2207/10016; G06T 2207/10024; G06T 2207/20182; G06T 2207/20201; G06T 3/4015; G06T 5/003; G06T 2207/10116; G06T 2207/20008; G06T 2207/20064; G06T 2207/30061; G06T 5/008; G06T 5/40; G06T 1/20; G06T 2207/20021; G06T 2207/20221; G06T 5/50; H04N 19/513; H04N 5/144; H04N 7/014; H04N 19/139; H04N 9/646; H04N 19/176; H04N 5/21; H04N 19/107; H04N 19/174; H04N 19/172; H04N 19/20; H04N 19/23; G09G 2320/106; G09G 2320/02; G06F 16/289
USPC ......... 382/260, 275, 276; 348/208, 229, 608
See application file for complete search history.

(56) References Cited

U.S. PATENT DOCUMENTS

| | | | | |
|---|---|---|---|---|
| 8,520,734 | B1* | 8/2013 | Xu | H04N 19/139 375/240.16 |
| 8,942,285 | B2* | 1/2015 | Demos | H04N 19/167 375/240.15 |
| 2003/0122967 | A1* | 7/2003 | Kondo | H04N 19/59 348/607 |
| 2005/0141047 | A1* | 6/2005 | Watanabe | H04N 9/045 358/471 |
| 2005/0232511 | A1* | 10/2005 | Ziou | G06T 17/00 382/276 |
| 2007/0247554 | A1 | 10/2007 | Okumichi et al. | |
| 2008/0198264 | A1* | 8/2008 | Balram | H04N 5/765 348/459 |
| 2010/0026898 | A1* | 2/2010 | Ueno | H04N 5/145 348/607 |
| 2010/0157072 | A1 | 6/2010 | Luo et al. | |
| 2010/0157073 | A1 | 6/2010 | Kondo et al. | |
| 2010/0191124 | A1* | 7/2010 | Prokoski | G06F 19/321 600/473 |
| 2010/0246991 | A1 | 9/2010 | Naito | |
| 2010/0266189 | A1* | 10/2010 | Knapp | G06T 5/008 382/132 |
| 2010/0302384 | A1* | 12/2010 | Sawada | H04N 5/23248 348/208.4 |
| 2011/0235942 | A1 | 9/2011 | Luo et al. | |
| 2012/0162528 | A1* | 6/2012 | Kiuchi | H04N 19/513 348/607 |
| 2012/0250995 | A1 | 10/2012 | Matsumoto et al. | |
| 2013/0279584 | A1* | 10/2013 | Demos | H04N 19/136 375/240.15 |
| 2014/0334557 | A1* | 11/2014 | Schierl | H04N 19/91 375/240.27 |
| 2015/0117551 | A1* | 4/2015 | Su | H04N 19/895 375/240.27 |
| 2015/0146103 | A1* | 5/2015 | Koo | G06T 7/40 348/607 |
| 2016/0328827 | A1* | 11/2016 | Ilic | H04N 5/2624 |

FOREIGN PATENT DOCUMENTS

| | | |
|---|---|---|
| JP | 2007-288595 A | 11/2007 |
| JP | 2010-147985 A | 7/2010 |
| JP | 2010-147986 A | 7/2010 |
| JP | 2010-239513 A | 10/2010 |
| JP | 2011-199716 A | 10/2011 |
| JP | 2013-225779 A | 10/2013 |

OTHER PUBLICATIONS

Chinese Office Action dated Jul. 20, 2020 in Chinese Patent Application No. 201680085460.6.

* cited by examiner

FIG. 3

| NODE NUMBER | EXAMPLE IMAGE | EXPLANATION |
|---|---|---|
| A | | IMAGE SIGNAL NRIN HAVING ORIGINAL RESOLUTION (BEFORE NR) |
| B | | IMAGE SIGNAL AFTER ONE-STAGE DOWNSAMPLING (BEFORE NR) |
| C | | IMAGE SIGNAL AFTER TWO-STAGE DOWNSAMPLING (BEFORE NR) |
| D | | IMAGE SIGNAL AFTER TWO-STAGE DOWNSAMPLING (AFTER NR) |
| E | | IMAGE SIGNAL AFTER ONE-STAGE DOWNSAMPLING (AFTER NR) |
| F | | IMAGE SIGNAL NROUT HAVING ORIGINAL RESOLUTION (AFTER NR) |

| INPUT/OUTPUT RESOLUTIONS | D1 | D2 | RESOLUTION OF BASE IMAGE |
|---|---|---|---|
| 1920 × 1080 (FULL HD) | 0 | 0 | 1920 × 1080 |
| 3840x2160 (4K RESOLUTION) | 1 | 0 | 1920 × 1080 |
| 7680x4320 (8K RESOLUTION) | 1 | 1 | 1920 × 1080 |

FIG. 8

| INPUT/OUTPUT RESOLUTIONS | FRAME RATE | D1 | D2 | RESOLUTION OF BASE IMAGE | BANDWIDTH (Mbps) |
|---|---|---|---|---|---|
| 1920×1080 (FULL HD) | 30fps | 0 | 0 | 1920×1080 | 496 |
| 1920×1080 (FULL HD) | 60fps | 0 | 0 | 1920×1080 | 992 |
| 1920×1080 (FULL HD) | 120ps | 1 | 0 | 960×540 | 496 |

IMAGE PROCESSING DEVICE, IMAGE PROCESSING METHOD, AND NON-TRANSITORY COMPUTER READABLE MEDIUM STORING IMAGE PROCESSING PROGRAM

CROSS-REFERENCE TO RELATED APPLICATIONS

This is a continuation of International Application PCT/JP2016/063845, with an international filing date of May 10, 2016, which is hereby incorporated by reference herein in its entirety.

TECHNICAL FIELD

The present invention relates to image processing devices, image processing methods, and image processing programs that are suitable for performing noise reduction on input video signals.

BACKGROUND ART

As a method of noise reduction, there is a known method in which noise having no correlation along the temporal direction is reduced by combining frame images of a moving image, as disclosed in Patent Literature 1. According to Patent Literature 1, a motion vector representing motion between images is calculated between a base image and a reference image, where the base image is the image of the current frame and the reference image is the image of the immediately preceding frame, the reference image is subjected to motion compensation by using the motion vector, and the base image is combined with the motion-compensated reference image while applying addition weights in accordance with the success or failure of motion estimation. Then, the result of the weighted combination is output as a noise-reduced image and is saved in a frame memory for use as the reference image for the next frame.

CITATION LIST

Patent Literature

{PTL 1}
Japanese Unexamined Patent Application, Publication No. 2010-147985

SUMMARY OF INVENTION

A first aspect of the present invention is an image processing device including a multi-resolution decomposing unit that decomposes an input image into a plurality of resolution images; a frame memory that saves a cyclic image of an immediately preceding frame as a reference image; a motion-vector detecting unit that sets, as a base image, an image having a lower resolution than the input image among the plurality of resolution images and that detects a motion vector between the base image and the reference image; a motion compensation unit that subjects the reference image to motion compensation on the basis of the motion vector to generate a motion-compensated image; a cyclic noise reduction unit that combines the base image with the motion-compensated image to generate a noise-reduced base image that serves as a new cyclic image; and a multi-resolution combining unit that combines the noise-reduced base image with the resolution image or resolution images other than the base image among the plurality of resolution images.

A second aspect of the present invention is an image processing method including a step of decomposing an input image into a plurality of resolution images; a step of setting, as a base image, an image having a lower resolution than the input image among the plurality of resolution images, and of detecting a motion vector between the base image and a reference image, the reference image being a cyclic image of an immediately preceding frame, saved in a frame memory; a step of subjecting the reference image to motion compensation on the basis of the motion vector to generate a motion-compensated image; a step of combining the base image with the motion-compensated image to generate a noise-reduced base image that serves as a new cyclic image; and a step of combining the noise-reduced base image with the resolution image or resolution images other than the base image among the plurality of resolution images.

A third aspect of the present invention is an image processing program for causing a computer to execute image processing including processing for decomposing an input image into a plurality of resolution images; processing for setting, as a base image, an image having a lower resolution than the input image among the plurality of resolution images, and for detecting a motion vector between the base image and a reference image, the reference image being a cyclic image of an immediately preceding frame, saved in a frame memory; processing for subjecting the reference image to motion compensation on the basis of the motion vector to generate a motion-compensated image; processing for combining the base image with the motion-compensated image to generate a noise-reduced base image that serves as a new cyclic image; and processing for combining the noise-reduced base image with the resolution image or resolution images other than the base image among the plurality of resolution images.

BRIEF DESCRIPTION OF DRAWINGS

FIG. 3 is a table showing an example of images at individual nodes in the noise reducing unit shown in FIG. 2.

FIG. 8 is a table showing an example of control in the noise reducing unit according to the second embodiment of the present invention.

DESCRIPTION OF EMBODIMENTS

Image processing systems according to embodiments of the present invention will be described below in detail with reference to the drawings.

First Embodiment

Figure 1:
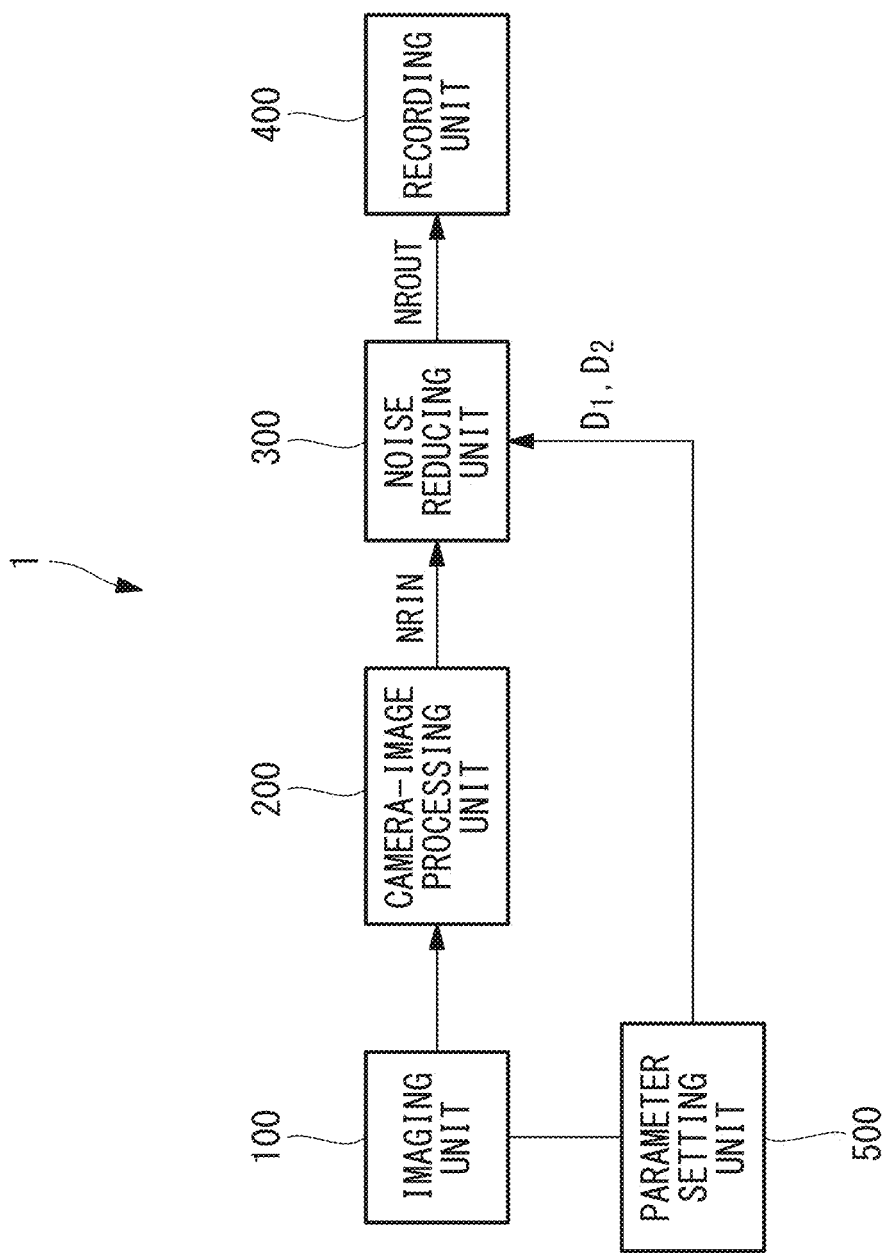
FIG. 1 is a diagram showing an example configuration of an image processing system according to first and second embodiments of the present invention.

FIG. 1 is a diagram showing an image processing system 1 according to a first embodiment of the present invention. For example, the image processing system 1 is a digital video camera, a digital still camera having a moving-picture capturing functionality, etc. that captures a moving picture and records video data.

The image processing system 1 includes an imaging unit 100, a camera-image processing unit 200, a noise reducing unit (image processing device) 300, a recording unit 400, and a parameter setting unit (selector controller) 500. The imaging unit 100 is connected to the camera-image processing unit 200 and the parameter setting unit 500. The camera-image processing unit 200 and the parameter setting unit 500 are connected to the noise reducing unit 300. The noise reducing unit 300 is connected to the recording unit 400.

The imaging unit 100 includes an optical lens, an image sensor, an AD (analog-to-digital) converter, etc., in which the optical lens converts optical information forming an image on the image sensor into electrical information, and the AD converter, etc. convert the electrical information into a digital signal. For example, in the case where a moving picture having a frame rate of 60 fps is captured, an image capturing operation is repeated 60 times per second, and a digital signal representing the resulting frame images is sequentially supplied to the subsequent stage.

The camera-image processing unit 200 executes processing for rendering the digital signal supplied from the imaging unit 100 into images. For example, the main kinds of processing include white balance correction, Y/C conversion, gray level transformation, and color correction. Furthermore, in the case of a single-chip image sensor, demosaic processing is also executed.

The noise reducing unit 300 subjects an image signal NRIN supplied from the camera-image processing unit 200 to noise reduction processing based on control parameters D1 and D2 set by the parameter setting unit 500. The noise reduction processing will be described later in detail.

The recording unit 400 saves a noise-reduced image signal NROUT supplied from the noise reducing unit 300 on an external medium, such as a memory card.

The parameter setting unit 500 sets control parameters D1 and D2 on the basis of image information such as the resolution and frame rate of the images supplied from the imaging unit 100.

In this embodiment, the camera-image processing unit 200 and the noise reducing unit 300, which execute image processing, are implemented as circuits on a single silicon chip, referred to as an image processing engine.

Now, the noise reducing unit 300 will be described in detail with reference to FIG. 2.

Figure 2:
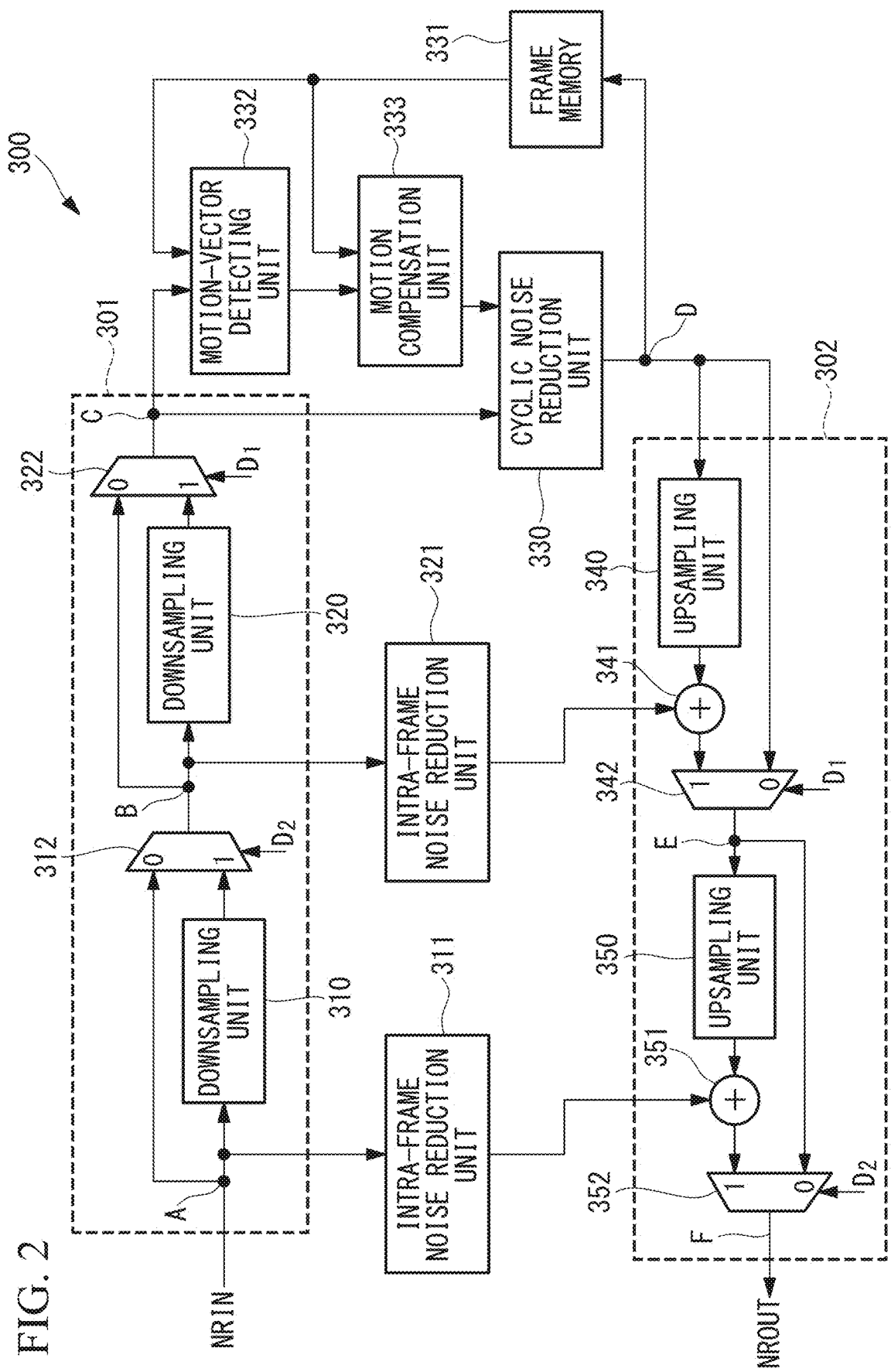
FIG. 2 is a diagram schematically showing the configuration of a noise reducing unit included in the image processing system in FIG. 1.

As shown in FIG. 2, the noise reducing unit 300 includes a multi-resolution decomposing unit 301, intra-frame noise reduction units 311 and 321, a frame memory 331, a motion-vector detecting unit 332, a motion compensation unit 333, a cyclic noise reduction unit 330, and a multi-resolution combining unit 302.

The multi-resolution decomposing unit 301 includes downsampling units 310 and 320 and selectors 312 and 322.

The downsampling units 310 and 320 are each constituted of a low-pass filter and a pixel decimating unit (not shown). For example, a 3×3 Gaussian filter given below is applied to an input image, and then downsampling is performed by vertically and horizontally decimating pixels at intervals of one pixel.

$$\begin{bmatrix} 1 & 2 & 1 \\ 2 & 4 & 2 \\ 1 & 2 & 1 \end{bmatrix}$$

The selector 312 is configured to output either a signal input to input terminal 0 thereof or a signal input to input terminal 1 thereof in accordance with the 1-bit control parameter D2 set by the parameter setting unit 500.

The selector 322 is configured to output either the signal input to input terminal 0 thereof or the signal input to input terminal 1 thereof in accordance with the 1-bit control parameter D1 set by the parameter setting unit 500.

The former stage of the multi-resolution decomposing unit 301 is configured such that the image signal NRIN supplied from the camera-image processing unit 200 is input to input terminal 0 of the selector 312 and such that a signal obtained by downsampling the image signal NRIN in the downsampling unit 310 is input to input terminal 1 of the selector 312.

The latter stage of the multi-resolution decomposing unit 301 is configured such that a signal output from the selector 312 is input to input terminal 0 of the selector 322 and such that a signal obtained by downsampling the signal output from the selector 312 in the downsampling unit 320 is input to input terminal 1 of the selector 322.

In this embodiment, downsampling is performed in the multi-resolution decomposing unit 301 in two stages, namely, in the former stage and the latter stage. However, without limitation to this embodiment, downsampling may be performed in one stage or in three or more stages.

The intra-frame noise reduction units 311 and 321 are configured to perform noise reduction by using information about pixels or a region spatially adjacent to a pixel of interest. For example, it is possible to use a bilateral filter expressed by equation (1).

$$A_p^{NR} = \frac{1}{k(p)} \sum_{p' \in \Omega} g_d(p' - p) g_r(A_p - A_{p'}) A_{p'} \quad (1)$$

Here, k(p) signifies a normalization function expressed by equation (2) below.

$$k(p) = \sum_{p' \in \Omega} g_d(p' - p) g_r(A_p - A_{p'}) \quad (2)$$

Here, p signifies the position of the pixel of interest, p' signifies the position of a reference pixel included in a region Ω, and A signifies a pixel value. $A_p$ signifies the pixel value of the pixel of interest, $A_{p'}$ signifies the pixel value of the reference pixel, and $A^{NR}_p$ signifies the pixel value of the pixel of interest after noise reduction. Furthermore, gd signifies a distance coefficient, for which a Gaussian function centered at the position of the pixel of interest is usually used. gr signifies a monotonically decreasing function whose value decreases as the difference ($A_p$-$A_{p'}$) between the pixel value of the pixel of interest and the pixel value of the reference pixel increases.

The bilateral filter is obtained by applying an evaluation function based on the difference between the pixel values to an ordinary Gaussian filter and is effective as an edge-preserving noise reduction filter.

The motion-vector detecting unit 332 is configured to detect a motion vector on a per-pixel basis or a per-region basis by using the signal output from the selector 322 as a base image and a cyclic image of the immediately preceding frame, saved in the frame memory 331, as a reference image. For example, block matching may be adopted as the method of detecting a motion vector.

The motion compensation unit 333 is configured to perform motion compensation for the cyclic image of the immediately preceding frame, saved in the frame memory 331, i.e., the reference image, by using the motion vectors detected by the motion-vector detecting unit 332 and to output the result as a motion-compensated image.

The cyclic noise reduction unit 330 is configured to perform noise reduction processing by combining the motion-compensated image output from the motion compensation unit 333 and the base image output from the selector 322, thereby outputting a noise-reduced base image.

The cyclic noise reduction unit 330 performs noise reduction processing by executing the processing expressed by equation (3) below, wherein I[n] signifies the base image, I[n−1] signifies the reference image, and O[n] signifies the noise-reduced base image that is output.

$$O[n]=(1-\alpha)\cdot I[n]+\alpha\cdot I[n-1] \quad (3)$$

where $0 \leq \alpha < 1$.

Here, α is a coefficient that is determined by evaluation on a per-pixel basis or a per-region basis and is controlled so as to increase as the degree of matching between the base image and the reference image becomes higher.

As an evaluation, for example, the difference between the pixel of interest in the base image and the pixel of interest in the reference image or the sum of absolute differences (SAD) of the pixel of interest in relation to a neighboring region is used.

The frame memory 331 is configured to save the noise-reduced base image generated by the cyclic noise reduction unit 330 as a cyclic image.

The multi-resolution combining unit 302 includes upsampling units 340 and 350, adders 341 and 351, and selectors 342 and 352.

The upsampling units 340 and 350 are configured to perform upsampling by executing pixel interpolation by bilinear interpolation, bicubic interpolation, or the like.

The selector 342 is configured to output either a signal input to input terminal 0 thereof or a signal input to input terminal 1 thereof in accordance with the 1-bit control parameter D1 set by the parameter setting unit 500.

The selector 352 is configured to output either a signal input to input terminal 0 thereof or a signal input to input terminal 1 thereof in accordance with the 1-bit control parameter D2 set by the parameter setting unit 500.

The former stage of the multi-resolution combining unit 302 is configured such that the noise-reduced base image output from the cyclic noise reduction unit 330 is input to input terminal 0 of the selector 342 and such that a signal obtained by adding together a signal obtained by upsampling the noise-reduced base image by the upsampling unit 340 and a signal obtained by subjecting the signal output from the selector 312 to noise reduction by the intra-frame noise reduction unit 321 is input to input terminal 1 of the selector 342.

The latter stage of the multi-resolution combining unit 302 is configured such that the signal output from the selector 342 is input to input terminal 0 of the selector 352 and such that a signal obtained by adding together a signal obtained by upsampling the signal output from the selector 342 by the upsampling unit 350 and a signal obtained by subjecting the image signal NRIN to noise reduction by the intra-frame noise reduction unit 311 is input to input terminal 1 of the selector 352.

Next, the operation of the image processing system 1 configured as described above will be described.

When a user starts shooting, in the imaging unit 100, optical information about an object whose image is formed on the image sensor via the optical lens is converted into electrical information, and the electrical information is further converted into a digital signal by the AD converter, etc. The converted digital signal is subjected to preprocessing, such as white balance correction, in the camera-image processing unit 200, and the result is input to the noise reducing unit 300 as an image signal NRIN.

Furthermore, image information that is preset in the imaging unit 100, such as an input image size and a frame rate, is output to the parameter setting unit 500.

In the parameter setting unit 500, the control parameters D1 and D2 for controlling the noise reducing unit 300 are set on the basis of the input image information. Specifically, a central processing unit (CPU) (not shown) included in the parameter setting unit 500 writes the control parameters D1 and D2 to a register for parameter setting, whereby the control parameters D1 and D2 are set.

Then, the noise reducing unit 300 performs noise reduction processing on the basis of the set control parameters D1 and D2 and outputs a noise-reduced image signal NROUT.

Then, the noise-reduced image signal NROUT is recorded in the recording unit 400.

Next, the operation of the noise reducing unit 300 in the case where the control parameters are set as (D1, D2)=(1, 1) will be described.

Since the control parameters are set as (D1, D2)=(1, 1), for all of the selectors 312, 322, 342, and 352, the signals input to the respective input terminals 1 are output to the respective output terminals.

The image signal NRIN supplied from the camera-image processing unit 200, which represents a high-resolution image, is subjected to intra-frame noise reduction by applying a spatial filter thereto in the intra-frame noise reduction unit 311.

The term "high-resolution" means that the resolution is relatively higher compared with the resolutions of other images that are generated internally during the processing in the noise reducing unit 300.

Meanwhile, the image signal NRIN is reduced to half the size by the downsampling unit 310. In this description, the term "reduce" means reducing the vertical size and the horizontal size. That is, in the case of reduction to half the size, the amount of data becomes ¼. Similarly, "enlarge" means enlarging the vertical size and the horizontal size. That is, in the case of enlargement to double the size, the amount of data becomes quadrupled.

The image that has been downsampled and reduced to half the size by the downsampling unit 310 (intermediate-resolution image) is subjected to intra-frame noise reduction by applying a spatial filter thereto in the intra-frame noise reduction unit 321.

Meanwhile, the intermediate-resolution image is further reduced to half the size by the downsampling unit 320. Thus, the signal output from the selector 322 represents an image reduced to quarter the size (low-resolution image) compared with the image represented by the image signal NRIN. In other words, the image signal representing the low-resolution image includes components having a frequency that is a quarter of the frequency of the components of the image signal NRIN.

As described above, in the multi-resolution decomposing unit 301, the image signal NRIN is decomposed into three resolution images, namely, a high-resolution image, an intermediate-resolution image, and a low-resolution image.

Then, cyclic noise reduction processing is performed by using the low-resolution image as a base image among the three resolution images.

First, the motion-vector detecting unit 332 detects a motion vector on a per-pixel basis or a per-region basis by using block matching or the like from the low-resolution image serving as the base image and the frame image of the immediately preceding frame, saved in the frame memory 331.

Alternatively, instead of detecting a motion vector, the motion vector may be considered as zero, assuming that there is no motion between frames.

Then, the motion compensation unit 333 performs motion compensation on the basis of the motion vectors detected by the motion-vector detecting unit 332 such that the frame image read from the frame memory 331 matches the current base image, whereby a motion-compensated image is generated.

Thus, it is possible to perform cyclic noise reduction processing efficiently even in the case where the object is moving, which serves to improve the effect of the cyclic noise reduction processing.

Then, the cyclic noise reduction unit 330 combines the generated motion-compensated image with the base image to generate a low-resolution noise-reduced base image.

Then, the generated low-resolution noise-reduced base image is combined with the intermediate-resolution image subjected to the intra-frame noise reduction processing, while matching the resolutions of these images. Specifically, the generated low-resolution noise-reduced base image is enlarged to double the size by the upsampling unit 340, and the result is added to the image output from the intra-frame noise reduction unit 321 by the adder 341, whereby an intermediate-resolution noise-reduced image is generated.

Then, the generated intermediate-resolution noise-reduced base image is combined with the high-resolution image subjected to the intra-frame noise reduction processing, while matching the resolutions of these images. Specifically, the generated intermediate-resolution noise-reduced base image is enlarged to double the size by the upsampling unit 350, and the result is added to the image output from the intra-frame noise reduction unit 311 by the adder 351, whereby a high-resolution noise-reduced image is generated.

In this manner, the multi-resolution combining unit 302 combines the low-resolution noise-reduced base image subjected to the cyclic noise reduction processing with the intermediate-resolution and high-resolution noise-reduced images subjected to the intra-frame noise reduction processing, while matching the resolutions of these images.

The high-resolution noise-reduced image generated as described above is output from the noise reducing unit 300 as a noise-reduced image signal NROUT.

As described above, the cyclic noise reduction unit 330 performs the cyclic noise reduction processing only on one of the images having lower resolutions than the input image signal NRIN. Thus, it is possible to reduce the capacity of the frame memory 331 and the amount of access to the frame memory 331 that are required when performing the cyclic noise reduction processing.

FIG. 3 shows an example of images at node A to node F shown in FIG. 2. The image signal after one-stage downsampling at node B is reduced to half the size compared with the original-resolution image signal at node A. Furthermore, the image signals after two-stage downsampling at node C and node D are reduced to quarter the size compared with the original-resolution image signal at node A. This indicates that it is also possible to considerably reduce the amount of access to the frame memory 331 required in performing the cyclic noise reduction processing.

Next, the operation of the noise reducing unit 300 in the case where the control parameters are set as (D1, D2)=(1, 0) will be described.

Figure 4:
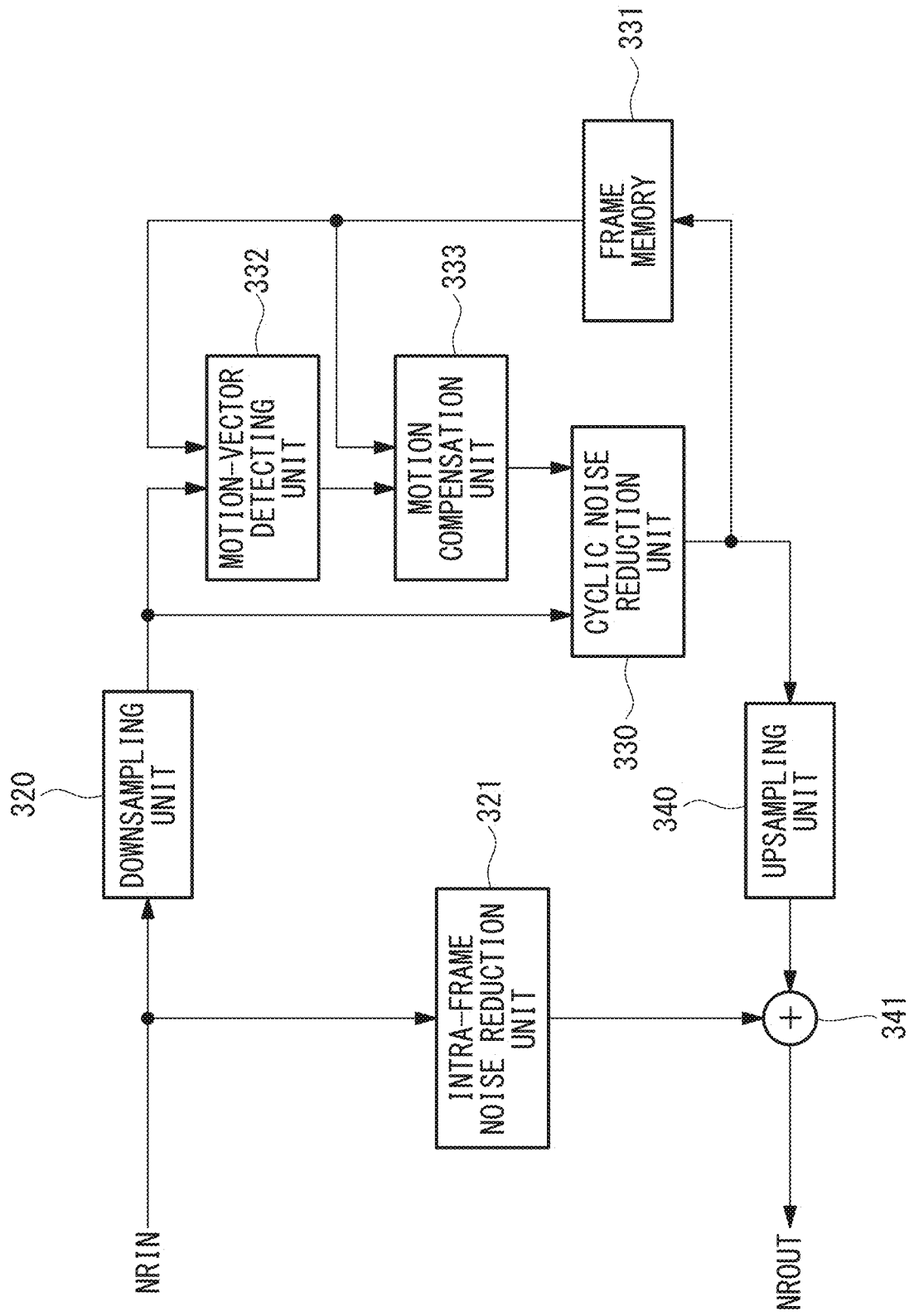
FIG. 4 is a diagram showing an equivalent circuit in the case where control parameters are set as (D1, D2)=(1, 0) in the noise reducing unit shown in FIG. 2.

Since the control parameters are set as (D1, D2)=(1, 0), the signals input to the respective input terminals 0 of the selectors 312 and 352 are output to the respective output terminals thereof, and the signals input to the respective input terminals 1 of the selectors 322 and 342 are output to the respective output terminals thereof. Thus, the equivalent circuit in this case becomes as shown in FIG. 4.

The image signal NRIN supplied from the camera-image processing unit 200, which represents a high-resolution image, is subjected to intra-frame noise reduction by applying a spatial filter thereto in the intra-frame noise reduction unit 321.

Meanwhile, the image signal NRIN is reduced to half the size by the downsampling unit 320.

Then, cyclic noise reduction processing is performed by using the image reduced to half the size by the downsampling unit 320 (intermediate-resolution image) as a base image. Since the cyclic noise reduction processing has already been described, a description thereof will be omitted here.

The noise-reduced image generated through the cyclic noise reduction processing is enlarged to double the size by the upsampling unit 340, and the result is added to the image output from the intra-frame noise reduction unit 321 by the adder 341, whereby a high-resolution noise-reduced image is generated.

The high-resolution noise-reduced image generated in this manner is output from the noise reducing unit 300 as a noise-reduced image signal NROUT.

In the case where the control parameters are set as (D1, D2)=(0, 1), in comparison with the case shown in FIG. 4, the role of the downsampling unit 320 is played by the downsampling unit 310, the role of the intra-frame noise reduction unit 321 is played by the intra-frame noise reduction unit 311, the role of the upsampling unit 340 is played by the upsampling unit 350, and the role of the adder 341 is played by the adder 351. That is, this case is equivalent to the block diagram shown in FIG. 4, and thus a description thereof will be omitted.

Figures 5, 6:
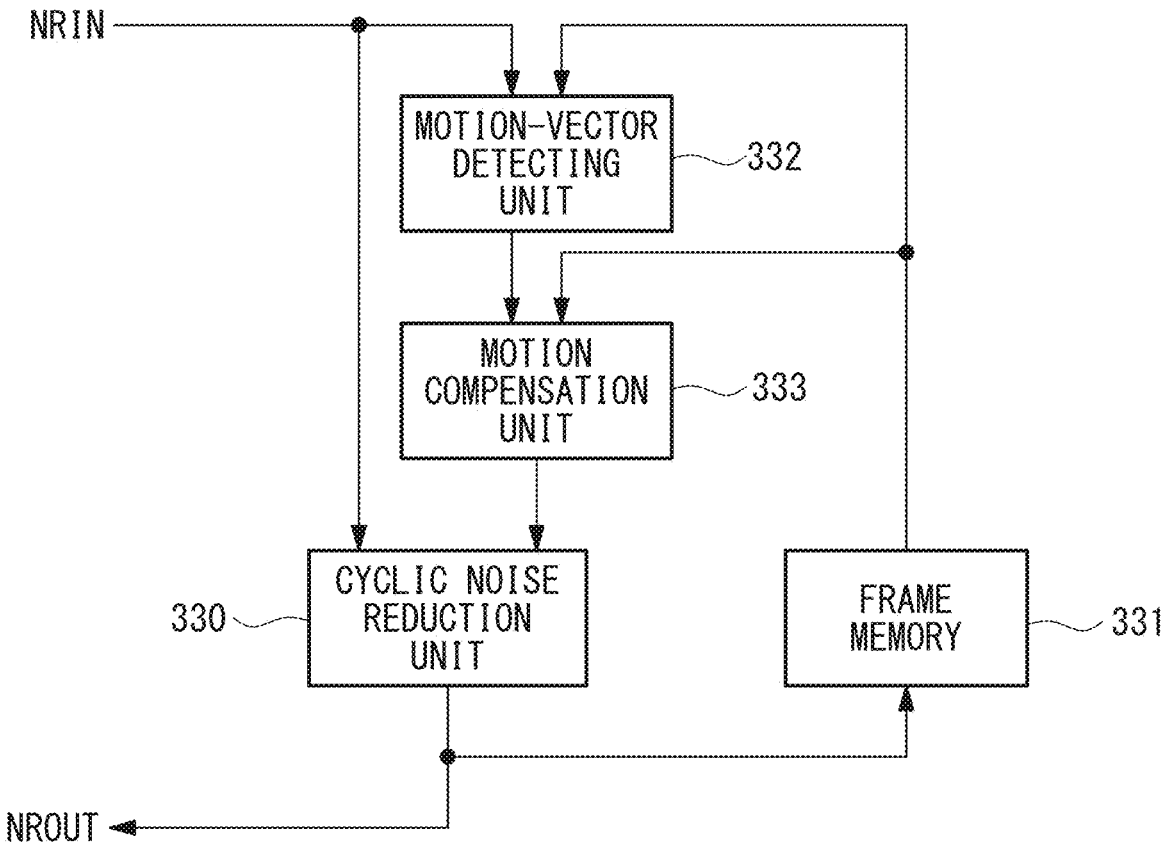
FIG. 5 is a diagram showing an equivalent circuit in the case where the control parameters are set as (D1, D2)=(0, 0) in the noise reducing unit shown in FIG. 2.
FIG. 6 is a table showing an example of control in the noise reducing unit according to the first embodiment of the present invention.

In the case where the control parameters are set as (D1, D2)=(0, 0), only cyclic noise reduction is performed, as shown in FIG. 5.

As described above, the parameter setting unit 500 controls the selectors 312, 322, 342, and 352 by setting the control parameters D1 and D2 on the basis of the input image information. This makes it possible to suitably determine the resolution of a base image for which cyclic noise reduction processing is performed in the cyclic noise reduction unit 330, in accordance with the image information. As a result, it is possible to reduce the capacity of the frame memory 331 and the amount of access to the frame memory 331.

FIG. 6 is a table showing an example of control in the noise reducing unit 300 according to this embodiment.

Specifically, the table shows the relationships among the input/output resolutions, i.e., the resolutions of the image signal NRIN and the noise-reduced image signals NROUT, the control parameters D1 and D2 set by the parameter setting unit 500, and the resolution of the base image.

The parameter setting unit 500 according to this embodiment sets the control parameters D1 and D2 such that the resolution of the base image becomes constant in accordance with the resolution of the image signal NRIN. The parameter setting unit 500 includes a table in which values of the control parameters D1 and D2 are associated with the individual levels of the input and output resolutions. The parameter setting unit 500 is configured to perform control so as to switch the selectors 312, 322, 342, and 352 of the noise reducing unit 300 according to this table.

In the example shown in FIG. 6, in the case where the resolution of the image signal NRIN is the full high-definition (HD) resolution (horizontally 1920×vertically 1080), the cyclic noise reduction processing is performed for all the frequency components included in the image signal NRIN. In the case where the resolution of the image signal NRIN is the 4k resolution (horizontally 3840×vertically 2160), the cyclic noise reduction is performed for the components of frequencies not higher than half of the highest frequency of the image signal NRIN. In the case where the resolution of the image signal NRIN is the 8k resolution (horizontally 7680×vertically 4320), the cyclic noise reduction is performed for the components of frequencies not higher than one-quarter of the highest frequency of the image signal NRIN. For the components of higher frequencies, the intra-frame noise reduction processing is performed.

This makes it possible to maintain the amount of data transferred between the cyclic noise reduction unit 330 and the frame memory 331 constant at a certain amount. Thus, even in the case where the image signal NRIN has a high frequency, it is possible to perform the cyclic noise reduction processing efficiently without increasing power consumption.

In this embodiment, the noise reducing unit 300 is implemented as hardware. However, without limitation to this embodiment, the noise reducing unit 300 may be implemented by a computer executing an image processing program constituting software.

Figure 7:
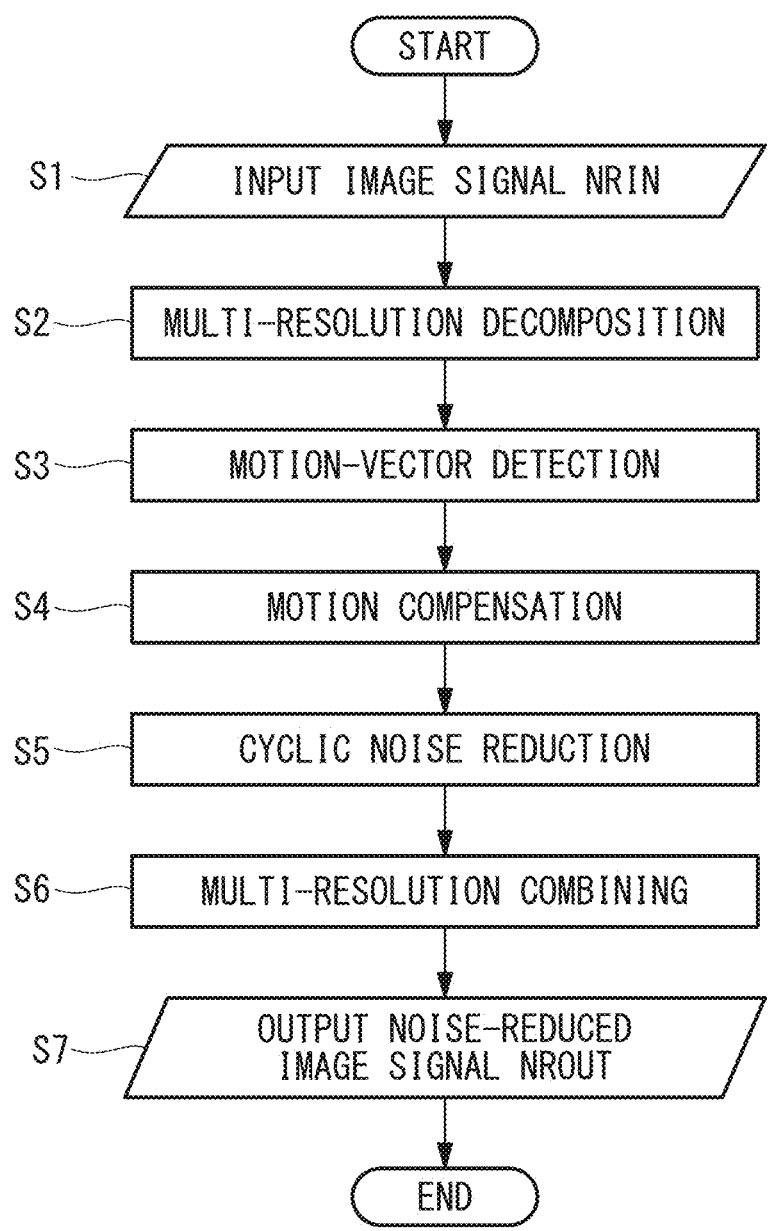
FIG. 7 is a flowchart showing processing in the noise reducing unit shown in FIG. 2.

The processing procedure of an image processing method realized by a computer executing an image processing program will be described below with reference to FIG. 7.

First, when an image signal NRIN is input in step S1, in step S2, the image signal NRIN is subjected to multi-resolution decomposition processing to decompose the image signal NRIN into images having a plurality of resolutions. Then, in step S3, motion vectors are detected between an image (base image) having a lower resolution than the image signal NRIN among the plurality of decomposed images and a cyclic image of the immediately preceding frame (reference image). Then, in step S4, the reference image is subjected to motion compensation on the basis of the detected motion vectors, whereby a motion-compensated image is generated. Then, in step S5, the base image is combined with the motion-compensated image to perform cyclic noise reduction processing, whereby a noise-reduced base image is generated. Then, in step S6, multi-resolution combining processing is performed to combine the images having resolutions other than the resolution of the base image with the noise-reduced base image. Then, in step S7, the result is output as a noise-reduced image signal NROUT.

Second Embodiment

An image processing device according to a second embodiment of the present invention will be described below.

This embodiment differs from the above-described first embodiment in the configuration of the parameter setting unit 500. This embodiment is the same as the first embodiment in other respects, and thus descriptions thereof will be omitted.

FIG. 8 is a table showing an example of control in the noise reducing unit 300 according to this embodiment. Specifically, the table shows the relationships among the input/output resolutions, i.e., the resolutions and frame rates of the image signal NRIN and the noise-reduced image signals NROUT, the control parameters D1 and D2 set by the parameter setting unit 500, the resolution of the base image, and the bandwidth.

The parameter setting unit 500 according to this embodiment sets the control parameters D1 and D2 such that the resolution of the base image decreases as the frame rate of the image signal NRIN serving as an input signal increases. The parameter setting unit 500 includes a table in which values of the control parameters D1 and D2 are associated with the individual levels of the input and output resolutions and the individual frame rates. The parameter setting unit 500 is configured to perform control so as to switch the selectors 312, 322, 342, and 352 of the noise reducing unit 300 according to this table.

This setting is based on the characteristics of human vision. Generally, the temporal resolution of human visual perception is not so high. For example, with human visual perception, it is not possible to recognize blinking of a non-inverter fluorescent light at 100 Hz. This indicates that a moving image that alternates between black and white at a frame rate not less than 100 fps is recognized by the naked eye as being gray, which suggests that random noise is also recognized by human vision as being smoothed to a certain extent along the temporal axis even if noise reduction processing is not particularly performed.

In the example shown in FIG. 8, in the case where the frame rate of the image signal NRIN is 30 fps or 60 fps, the cyclic noise reduction processing is performed for all the frequency components included in the image signal NRIN. In the case where the frame rate of the image signal NRIN is 120 fps, the cyclic noise reduction processing is performed for the components of frequencies not higher than half of the highest frequency of the image signal NRIN, and the intra-frame noise reduction processing is performed for the components of higher frequencies.

This makes it possible to perform the cyclic noise reduction processing efficiently without increasing the amount of data transferred between the cyclic noise reduction unit 330 and the frame memory 331 even in the case where the frame rate of the image signal NRIN is high.

In the example shown in FIG. 8, the resolution of the base image is controlled to be equal between the cases where the frame rate of the image signal NRIN is 30 fps and 60 fps. However, without limitation to this example, the resolution of the base image in the case where the frame rate is 60 fps may be lower than the resolution of the base image in the case where the frame rate is 30 fps. Also, the resolution of the base image may be decreased stepwise as the frame rate increases from 30 fps to 120 fps.

Although embodiments of the present invention have been described above in detail with reference to the drawings, specific configurations are not limited to these embodiments, and the present invention encompasses design modifications, etc. that do not depart from the gist thereof.

For example, in the above-described embodiments, the noise reducing unit 300 includes the selectors 312, 322, 342, and 352 and is configured to switch these selectors in accordance with image information about the image signal NRIN, i.e., the image size, the frame rate, etc. thereof. However, in the case where the image information of the input image signal NRIN is fixed, the selectors 312, 322, 342, and 352 may be omitted.

Furthermore, in the above-described embodiments, the intra-frame noise reduction units 311 and 321 are provided for the processing is not performed. However, the intra-frame noise reduction units 311 and 321 may be omitted.

As a result, the above-described embodiments lead to the following aspects.

A first aspect of the present invention is an image processing device including a multi-resolution decomposing unit that decomposes an input image into a plurality of resolution images; a frame memory that saves a cyclic image of an immediately preceding frame as a reference image; a motion-vector detecting unit that sets, as a base image, an image having a lower resolution than the input image among the plurality of resolution images and that detects a motion vector between the base image and the reference image; a motion compensation unit that subjects the reference image to motion compensation on the basis of the motion vector to generate a motion-compensated image; a cyclic noise reduction unit that combines the base image with the motion-compensated image to generate a noise-reduced base image that serves as a new cyclic image; and a multi-resolution combining unit that combines the noise-reduced base image with the resolution image or resolution images other than the base image among the plurality of resolution images.

With the image processing device according to the first aspect, an input image is decomposed into images having a plurality of resolutions by the multi-resolution decomposing unit. By using an image having a lower resolution than the input image among the decomposed images as a base image and using a cyclic image of an immediately preceding frame saved in the frame memory as a reference image, a motion vector between the base image and the reference image is detected by the motion-vector detecting unit. Then, the reference image is subjected to motion compensation by the motion compensation unit on the basis of the detected motion vector, whereby a motion-compensated image is generated. The generated motion-compensated image is combined with the base image by the cyclic noise reduction unit, whereby a noise-reduced base image is generated. Then, by the multi-resolution combining unit, the noise-reduced base image is combined with the images having resolutions other than the resolution of the base image among the decomposed images.

Since the cyclic noise reduction processing by the cyclic noise reduction unit is performed only on one of the images having lower resolutions than the input image, as described above, it is possible to reduce the capacity of the frame memory and the amount of access to the frame memory that are required when performing the cyclic noise reduction processing.

Furthermore, generally, display devices having high resolutions also have fine pixel pitches, so fine in the case of recent smartphones or the like that it is not possible to recognize pixels by the naked eye. In this case, if noise reduction processing is performed on a per-pixel basis, there is substantially no effect of noise reduction when evaluated subjectively. Thus, it is effective, and is also efficient from the viewpoint of power consumption, to perform noise reduction only on low-frequency components.

In the image processing device according to the first aspect, the resolution of the base image may be set on the basis of image information about the input image.

With this configuration, the resolution of the base image for which cyclic noise reduction processing is performed is set flexibly on the basis of the image information about the input image, such as the resolution and frame rate thereof. This makes it possible to reduce the capacity of the frame memory and the amount of access to the frame memory even in the case where various image signals are input.

The image processing device according to the first aspect may further include a selector that sets the resolution of the base image on the basis of the image size of the input image; and a selector controller that controls the selector, and the selector controller may switch the selector such that the resolution of the base image is maintained constant.

With this configuration, the selector is switched by the selector controller such that the resolution of the base image for which cyclic noise reduction processing is performed is maintained constant.

Accordingly, it is possible to constantly keep the amount of data transferred between the cyclic noise reduction unit and the frame memory at a certain level, which makes it possible to perform the cyclic noise reduction processing efficiently without increasing power consumption even with high-resolution image signals.

The image processing device according to the first aspect may further include a selector that sets the resolution of the base image on the basis of the image size of the input image; and a selector controller that controls the selector, and the selector controller may switch the selector such that the resolution of the base image decreases as the frame rate of the input image increases.

With this configuration, the selector is switched by the selector controller such that the resolution of the base image for which cyclic noise reduction processing is performed decreases as the frame rate of the input image increases.

Accordingly, even if the input image is constituted of an image signal having a high frame rate, it is possible to perform the cyclic noise reduction processing efficiently without increasing the amount of data transferred between the cyclic noise reduction unit and the frame memory.

This utilizes the characteristics of human vision, with which it becomes difficult to recognize the effects of high-frequency noise as the frame rate increases since low-pass filter effects occur in visual perception.

The image processing device according to the first aspect may further include an intra-frame noise reduction unit that performs noise reduction by applying a spatial filter to the resolution image or resolution images other than the base image.

A second aspect of the present invention is an image processing method including a step of decomposing an input image into a plurality of resolution images; a step of setting, as a base image, an image having a lower resolution than the input image among the plurality of resolution images, and of detecting a motion vector between the base image and a reference image, the reference image being a cyclic image of an immediately preceding frame, saved in a frame memory; a step of subjecting the reference image to motion compensation on the basis of the motion vector to generate a motion-compensated image; a step of combining the base image with the motion-compensated image to generate a noise-reduced base image that serves as a new cyclic image; and a step of combining the noise-reduced base image with the resolution image or resolution images other than the base image among the plurality of resolution images.

A third aspect of the present invention is an image processing program for causing a computer to execute image processing including processing for decomposing an input image into a plurality of resolution images; processing for setting, as a base image, an image having a lower resolution than the input image among the plurality of resolution images, and for detecting a motion vector between the base image and a reference image, the reference image being a cyclic image of an immediately preceding frame, saved in a frame memory; processing for subjecting the reference image to motion compensation on the basis of the motion vector to generate a motion-compensated image; processing for combining the base image with the motion-compensated image to generate a noise-reduced base image that serves as a new cyclic image; and processing for combining the noise-reduced base image with the resolution image or resolution images other than the base image among the plurality of resolution images.

According to the present invention, an advantage is afforded in that it is possible to reduce the capacity of and the amount of access to a frame memory that are required when performing cyclic noise reduction.

REFERENCE SIGNS LIST

1 Image processing system
300 Noise reducing unit (image processing device)
301 Multi-resolution decomposing unit
302 Multi-resolution combining unit
311, 321 Intra-frame noise reduction unit
312, 322, 342, 352 Selector
330 Cyclic noise reduction unit
331 Frame memory
332 Motion-vector detecting unit
333 Motion compensation unit
500 Parameter setting unit (selector controller)

The invention claimed is:

1. An image processing device comprising:
a frame memory that saves a cyclic image of an immediately preceding frame as a reference image;
a processor comprising hardware, wherein the processor is configured to:
decompose an input image into a plurality of resolution images;
set, as a base image, an image having a lower resolution than the input image among the plurality of resolution images and that detects a motion vector between the base image and the reference image;
subject the reference image to motion compensation on a basis of the motion vector to generate a motion-compensated image;
combine the base image with the motion-compensated image to generate a noise-reduced base image that serves as a new cyclic image;
combine the noise-reduced base image with the resolution image or resolution images other than the base image among the plurality of resolution images; and
perform noise reduction by applying a spatial filter to the resolution image or resolution images other than the base image;
a selector that sets the resolution of the base image on a basis of the image size of the input image; and
a selector controller that is configured to control the selector,
wherein the resolution of the base image is set on a basis of image information about the input image, and
wherein the selector controller is configured to switch the selector such that the resolution of the base image is maintained constant.

2. An image processing method comprising:
decomposing an input image into a plurality of resolution images;
setting, as a base image, an image having a lower resolution than the input image among the plurality of resolution images, and of detecting a motion vector between the base image and a reference image, the reference image being a cyclic image of an immediately preceding frame, saved in a frame memory;
subjecting the reference image to motion compensation on a basis of the motion vector to generate a motion-compensated image;
combining the base image with the motion-compensated image to generate a noise-reduced base image that serves as a new cyclic image;
combining the noise-reduced base image with the resolution image or resolution images other than the base image among the plurality of resolution images; and
performing noise reduction by applying a spatial filter to the resolution image or resolution images other than the base image,
wherein the resolution of the base image is set on a basis of image information about the input image, and
wherein the decomposing of the input image switches a selector that sets the resolution of the base image on a basis of the image size of the input image such that the resolution of the base image is maintained constant.

3. A non-transitory computer readable medium storing an image processing program for causing a computer to execute image processing comprising:
processing for decomposing an input image into a plurality of resolution images;
processing for setting, as a base image, an image having a lower resolution than the input image among the plurality of resolution images, and for detecting a motion vector between the base image and a reference image, the reference image being a cyclic image of an immediately preceding frame, saved in a frame memory;
processing for subjecting the reference image to motion compensation on a basis of the motion vector to generate a motion-compensated image;
processing for combining the base image with the motion-compensated image to generate a noise-reduced base image that serves as a new cyclic image;
processing for combining the noise-reduced base image with the resolution image or resolution images other than the base image among the plurality of resolution images; and
performing noise reduction by applying a spatial filter to the resolution image or resolution images other than the base image,
wherein the resolution of the base image is set on a basis of image information about the input image, and
wherein the decomposing of the input image switches a selector that sets the resolution of the base image on a basis of the image size of the input image such that the resolution of the base image is maintained constant.

4. An image processing device comprising:
a frame memory that saves a cyclic image of an immediately preceding frame as a reference image;

a processor comprising hardware, wherein the processor is configured to:
  decompose an input image into a plurality of resolution images;
  set, as a base image, an image having a lower resolution than the input image among the plurality of resolution images and that detects a motion vector between the base image and the reference image;
  subject the reference image to motion compensation on a basis of the motion vector to generate a motion-compensated image;
  combine the base image with the motion-compensated image to generate a noise-reduced base image that serves as a new cyclic image;
  combine the noise-reduced base image with the resolution image or resolution images other than the base image among the plurality of resolution images; and
  perform noise reduction by applying a spatial filter to the resolution image or resolution images other than the base image;
a selector that sets the resolution of the base image on a basis of the image size of the input image; and
a selector controller that is configured to control the selector,
wherein the resolution of the base image is set on a basis of image information about the input image, and
wherein the selector controller is configured to switch the selector such that the resolution of the base image decreases as the frame rate of the input image increases.

\* \* \* \* \*